United States Patent
Yin et al.

(10) Patent No.: US 9,960,421 B2
(45) Date of Patent: May 1, 2018

(54) SULFUR-CONTAINING COMPOSITE FOR LITHIUM-SULFUR BATTERY, A PROCESS FOR PREPARING SAID COMPOSITE, AND THE ELECTRODE MATERIAL AND LITHIUM-SULFUR BATTERY COMPRISING SAID COMPOSITE

(71) Applicants: Robert Bosch GmbH, Stuttgart (DE); Institute of Chemistry, Chinese Academy of Sciences, Beijing (CN)

(72) Inventors: Yaxia Yin, Beijing (CN); Longjie Zhou, Shanghai (CN); Bernd Schumann, Rutesheim (DE); Juan Zhang, Beijing (CN); NaHong Zhao, Shanghai (CN); Yuguo Guo, Beijing (CN); Huan Ye, Beijing (CN)

(73) Assignees: Robert Bosch GmbH, Stuttgart (DE); Institute of Chemistry, Chinese Academy of Science, Beijing (CN)

( * ) Notice: Subject to any disclaimer, the term of this patent is extended or adjusted under 35 U.S.C. 154(b) by 36 days.

(21) Appl. No.: 15/025,942

(22) PCT Filed: Sep. 30, 2013

(86) PCT No.: PCT/CN2013/084772
§ 371 (c)(1),
(2) Date: Mar. 30, 2016

(87) PCT Pub. No.: WO2015/042977
PCT Pub. Date: Apr. 2, 2015

(65) Prior Publication Data
US 2016/0233492 A1  Aug. 11, 2016

(51) Int. Cl.
*H01M 4/38* (2006.01)
*H01M 10/0525* (2010.01)
(Continued)

(52) U.S. Cl.
CPC ............. *H01M 4/38* (2013.01); *H01M 4/136* (2013.01); *H01M 4/366* (2013.01); *H01M 4/382* (2013.01);
(Continued)

(58) Field of Classification Search
CPC combination set(s) only.
See application file for complete search history.

(56) References Cited

U.S. PATENT DOCUMENTS

| 2013/0095385 A1* | 4/2013 | Tran | C01G 23/005 |
| | | | 429/221 |
| 2013/0236784 A1* | 9/2013 | Lin | H01M 4/62 |
| | | | 429/212 |

(Continued)

FOREIGN PATENT DOCUMENTS

| CN | 101585527 | 11/2009 |
| CN | 101993068 A | 3/2011 |

(Continued)

OTHER PUBLICATIONS

International Search Report for Application No. PCT/CN2013/084772 dated Jun. 5, 2014 (2 pages).

*Primary Examiner* — Kaity Chandler
(74) *Attorney, Agent, or Firm* — Michael Best & Friedrich LLP (57) ABSTRACT

The present invention relates to a sulfur-containing composite with a core-shell structure for lithium-sulfur battery, wherein the substrate of the core contains macropores and/or mesopores and optionally micropores, and the substrate of the shell is a microporous coating layer; as well as a process for preparing said sulfur-containing composite, an electrode material and a lithium-sulfur battery comprising said sulfur-containing composite.

19 Claims, 6 Drawing Sheets

Scheme of the structure of the S/(HPCS@MPC) composite (51) Int. Cl.

| | | |
|---|---|---|
| H01M 10/0568 | (2010.01) | |
| H01M 4/66 | (2006.01) | |
| H01M 4/136 | (2010.01) | |
| H01M 4/62 | (2006.01) | |
| H01M 4/36 | (2006.01) | |
| H01M 4/58 | (2010.01) | |
| H01M 10/0569 | (2010.01) | |
| H01M 10/052 | (2010.01) | |
| H01M 4/02 | (2006.01) | |

(52) U.S. Cl.
  CPC ......... *H01M 4/5815* (2013.01); *H01M 4/623* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 10/052* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2014/0106223 A1* | 4/2014 | Xu | H01M 4/366 429/220 |
| 2014/0342233 A1* | 11/2014 | Guo | H01M 4/139 429/231.4 |
| 2014/0342234 A1* | 11/2014 | Guo | H01M 10/052 429/231.4 |
| 2015/0303458 A1* | 10/2015 | Guo | H01M 4/38 429/341 |

FOREIGN PATENT DOCUMENTS

| | | |
|---|---|---|
| CN | 102903887 A | 1/2013 |
| CN | 103219501 | 7/2013 |
| WO | 2012064702 | 5/2012 |
| WO | 2013078605 | 6/2013 |
| WO | 2013078618 | 6/2013 |
| WO | 2013120263 | 8/2013 |
| WO | 2014085992 | 6/2014 |

* cited by examiner

Fig. 1 Schematic diagrams of the S/(CMK@MPC) structure

Fig. 2 TEM image of CMK-3 before (a) and after (b) MPC coating

Fig. 3  Discharge-charge curves of the sulfur-containing composites (S% = 50 wt%) at a discharge-charge rate of 0.1C, a) the composite without MPC coating (S/CMK), b) the composite with MPC coating [S/(CMK@MPC)]

Fig. 4  Cycling performance of the sulfur-containing composites S/CMK and S/(CMK@MPC) at a discharge-charge rate of 0.1 C Fig. 5 N₂ adsorption-desorption isotherm (a) and the pore size distribution (b) of the activated microporous carbon (HPCS)

Fig. 6 TEM image of S/(HPCS@MPC) composite

Fig. 7 Scheme of the structure of the S/(HPCS@MPC) composite

Fig. 8  Discharge-charge curves of S/(HPCS@MPC) composite (sulfur load amount: 60 wt%) at 0.1 C, wherein the specific capacity was calculated based on the composite Fig. 9  Cycling performance of the sulfur-containing composites S/HPCS and S/(HPCS@MPC) at a discharge-charge rate of 0.1 C

SULFUR-CONTAINING COMPOSITE FOR LITHIUM-SULFUR BATTERY, A PROCESS FOR PREPARING SAID COMPOSITE, AND THE ELECTRODE MATERIAL AND LITHIUM-SULFUR BATTERY COMPRISING SAID COMPOSITE

TECHNICAL FIELD

The present invention relates to a sulfur-containing composite with a core-shell structure for lithium-sulfur battery; as well as a process for preparing said sulfur-containing composite, an electrode material and a lithium-sulfur battery comprising said sulfur-containing composite.

BACKGROUND ART

Sulfur is an attractive cathode material with a high specific capacity of 1,673 mAh/g. However, lithium-sulfur battery decays fast during cycling due to the cathode callapse, disrupted electronic contact and anode depletion (sometime electrolyte drying also counts). In one way we say sulfur cathode suffers from the problem of dissolution of polysulfides into the electrolyte which may cause cathode callapse, electrical contact disrupted and anode depletion. Achieving longevity of cycling over 1000 cycles in Li—S batteryies is still a big challenge, let alone the requirement of high power density for automotive battery application.

So far, many approaches for sulfur-carbon cathode have been developed to improve the performance of lithium-sulfur battery. An ideal carbon matrix for sulfur-carbon composites should have: (1) high pore volume to achieve high loading amounts of sulfur, (2) small pores without large outlets to accommodate polysulfides, (3) sufficient electrical conductivity to form efficient electron pathway for rapid lithiation/delitiation of sulfur. Mesoporous and macroporous carbons have been used to prepare sulfur-carbon composites, and sulfur usually stores as cyclooctasulfur ($S_8$) in the carbon channels.

Owing to the larger pore volumes of mesoporous/macroporous carbons, these composites usually have high sulfur loading rates. However, they can not essentially solve problem of the polysulfide dissolution due to a poor limitation of carbon mesopore/macropore on the polysulfides. As a result, significant sulfur losses on the cathodes are observed during the discharge-charge processes, which lead to rapid capacity fade. Recently, our research work of "smaller sulfur molecules (chain-like) promising better lithium-sulfur batteries" shows that the polysulfide dissolution can be effectively diminished by controlling the sulfur into smaller allotropes, which was highly dispersed and constrained by a microporous carbon (MPC) substrate, proclaimed by our prior patents of WO 2013/078618 A1, WO 2013/078605 A1, WO 2013/120263 A1, and not yet published PCT/CN2012/085898. Lithium-sulfur batteries based on this concept exhibits unprecedented electrochemical behavior with very stable cycling stability and high specific capacity.

However, the microporous-substrate-encapsulated small sulfur allotropes system demands larger pore volume to improve its sulfur loading rate so as to obtain a higher total specific capacity of the composite. On the other hand, the meso-/macroporous substrate enables a satisfactory sulfur loading rate of >50 wt. % in the composite with their large pore volume (usually >1 cm$^3$ g$^{-1}$), yet the cyclability of the composite should be enhanced due to its poor polysulfide confining ability.

SUMMARY OF INVENTION

Therefore, the sole use of either microporous or meso-/macroporous substrate can not obtain the optimized result. In order to combine both the advantages of mesoporous and microporous systems, the inventors developed a new sulfur-carbon cathode material based on a core-shell meso-/microporous carbon substrate for application in Li—S battery. With its unique structure, the core-shell meso-/microporous carbon substrate possesses the merits of both diminishing the polysulfide dissolution and a large pore volume for higher sulfur loading. All these guarantees a higher specific capacity of the composite and a stable cyclability of the Li—S battery. Other technologies which have potential to develop the same MPC enveloped core-shell structures are also claimed.

It is therefore an object of the present invention to provide a novel sulfur-containing composite which supplies the effective sulfur dispersion and the accomodation for large amounts of sulfur, and effectively restrains the polysulfides dissolution so as to enable a much improved cycling performance. Besides, the substrate of said sulfur-containing composite also provides a continuous network with a high electronic conductivity for sufficient electrical contacts to the insulating sulfur.

This object is achieved by a sulfur-containing composite with a core-shell structure, wherein the substrate of the core contains macropores and/or mesopores and optionally micropores, and the substrate of the shell is a microporous coating layer.

Another object of the present invention is to provide a process for preparing said sulfur-containing composite.

This object is achieved by a process for preparing a sulfur-containing composite with a core-shell structure, including the steps of:

a) providing a substrate of the core, which contains macropores and/or mesopores and optionally micropores; and b) applying a microporous coating layer as the shell onto said substrate of the core, before or after c) loading sulfur into said substrate of the core and optionally the shell.

According to another aspect of the invention, an electrode material is provided, which comprises the sulfur-containing composite according to the present invention.

According to another aspect of the invention, a lithium-sulfur battery is provided, which comprises the sulfur-containing composite according to the present invention.

BRIEF DESCRIPTION OF DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF PREFERRED EMBODIMENTS

The present invention relates to a sulfur-containing composite with a core-shell structure, wherein the substrate of the core contains macropores and/or mesopores and optionally micropores, and the substrate of the shell is a microporous coating (MPC) layer.

In the sulfur-containing composite according to the present invention, the substrate of the core has a BET specific surface area of 300-4500 $m^2/g$, preferably 500-3000 $m^2/g$, and more preferably 800-1500 $m^2/g$; a pore volume of 0.1-3.0 $cm^3/g$, preferably 0.3-2.0 $cm^3/g$, and more preferably 0.5-1.5 $cm^3/g$; and an average pore diameter of 0.4-100 nm, preferably 0.4-50 nm, and more preferably 0.4-10 nm.

In the sulfur-containing composite according to the present invention, the substrate of the core can be a carbon or conductive non-carbon substrate with ordered or disordered pore structures.

In an embodiment of the sulfur-containing composite according to the present invention, the substrate of the core can be a carbon substrate, preferably selected from the group consisting of ordered substrate, such as CMK-3, and CMK-5; and disordered substrate, such as activated porous carbon, and active charcoal; and any combinations of these substrates. Such substrates of the core are commercially available or can be obtained by known methods. The size of these substrates used here is not particularly limited, for example less than 0.5 μm, 0.5-5 μm, or more than 5 μm. The shape of these substrates used here is not particularly limited either, for example short rod, sphere, polyhedron, or any other shapes.

In another embodiment of the sulfur-containing composite according to the present invention, the substrate of the core can be a hierarchically meso-/microporous carbon substrate, the shape of which can be a sphere with a diameter ranging from 100 nm-10 μm, preferably 100-1000 nm, more preferably from 200-500 nm.

In the sulfur-containing composite according to the present invention, the microporous coating layer can be made from one or more material selected from the group consisting of microporous carbon, microporous conductive polymer, microporous metal oxides, microporous metal, and microporous silica.

In the sulfur-containing composite according to the present invention, the microporous coating layer has a thickness of 5-100 nm, preferably 10-50 nm, and more preferably 15-20 nm; and an average pore diameter of 0.4-2.0 nm.

Sulfur is loaded into the substrate of the core and optionally the shell. The sulfur-containing composite according to the present invention has a sulfur load amount of 20-90 wt. %, preferably 30-80 wt. %, and more preferably 40-60 wt. %, in each case based on the total weight of the sulfur-containing composite.

The present invention further relates to a process for preparing a sulfur-containing composite with a core-shell structure, including the steps of:

a) providing a substrate of the core, which contains macropores and/or mesopores and optionally micropores; and then b) applying a microporous coating layer as the shell onto said substrate of the core, before or after c) loading sulfur into said substrate of the core and optionally the shell.

a) Providing a Substrate of the Core:

In an embodiment of the process according to the present invention, the substrate of the core can be a carbon substrate, preferably selected from the group consisting of ordered substrate, such as CMK-3, and CMK-5; and disordered substrate, such as activated porous carbon, and active charcoal; and any combinations of these substrates. Such substrates of the core are commercially available or can be obtained by known methods.

An ordered carbon substrate of the core, for example CMK-3, can be formed by using an ordered template, for example mesoporous $SiO_2$ SBA-15, which can be synthesized by a method reported by Dong-Yuan Zhao, et al., *Triblock Copolymer Syntheses of Mesoporous Silica with Periodic 50 to 300 Angstrom Pores*, Science, 1998, 279, 548. The template can be removed preferably after the step of "b) applying a microporous coating layer".

In another embodiment of the process according to the present invention, the substrate of the core can be a hierarchically meso-/microporous carbon substrate, the shape of which can be a sphere with a diameter ranging from 100 nm-10 μm, preferably 100-1000 nm, more preferably from 200-500 nm.

The hierarchically meso-/microporous carbon substrate can be prepared by (i) a hydrothermal method to obtain a microporous carbon substrate and then by (ii) pore activation of said microporous carbon substrate to obtain said hierarchically meso-/microporous carbon substrate.

(i) Hydrothermal Method

The carbon source of said hydrothermal method can be carbohydrates, preferably selected from the group consisting of sucrose, D-glucose, fructose, and any combinations thereof.

A hydrothermal method can be employed to prepare microporous carbon spheres (MPCS), in which 2-8 parts by weight of carbohydrates can be dissolved in 20-60 parts by weight of water, the solution can be then sealed in an autoclave and reacted at 150-200° C. for 2-12 h to yield the MPCS. The products can be centrifuged and washed with water and ethanol for several times before being further dried at an elevated temperature, for example about 50° C., in an oven.

(ii) Pore Activation

The "pore activation" can be carried out by dispersing the MPCS as obtained in (i) into an aqueous solution of potassium hydroxide to obtain a suspension; subjecting the suspension to sonication, standing and filtration; drying and annealing the filtrated MPCS for pore activation and further carbonization.

In particular, 50-400 mg of the MPCS as obtained in (i) can be dispersed in 2.5-40 mL of aqueous solution of potassium hydroxide (KOH, 0.1-10 mol/L). The suspension can be then subjected to a sonicating of 2-8 h, and then standing for 10-48 h to enable a complete adsorption of KOH in the micropores before filtration. The filtrated MPCS can be dried at an elevated temperature, for example about 50° C., in an oven; and then further annealed at 700-1000° C. in an inert gas, such as nitrogen and argon, for 2-4 h at a heating rate of 2-10° C./min for pore activation and further carbonization. To ensure a complete removal of KOH, the resulting sample can be washed continuously with de-ionized water until the pH of the filtrate becomes 7.

b) Applying a Microporous Coating Layer:

The coating method of the microporous coating layer is not particularly limited. The microporous coating layer can be applied by one or more coating method selected from the group consisting of (i) hydrothermal microporous carbon coating, (ii) coating at room temperature with biomolecule, (iii) CVD coating, conductive polymer coating, (iv) resorcinol-formaldehyde resin carbon coating, and (v) in-situ polymerization.

The step of "b) applying a microporous coating layer" can be carried out to obtain a microporous coating layer having a thickness of 5-100 nm, preferably 10-50 nm, and more preferably 15-20 nm, and an average pore diameter of 0.4-2.0 nm.

(i) Hydrothermal Microporous Carbon Coating:

The carbon source of said hydrothermal microporous carbon (MPC) coating can be carbohydrates, preferably selected from the group consisting of sucrose, D-glucose, fructose, and any combinations thereof.

In particular, 100-500 parts by weight of the core material can be first mixed with 400-1000 parts by weight of carbohydrate in an autoclave. The hydrothermal reaction can be carried out at 150-190° C. for 10-20 h, the stirring speed can be 200-500 r/min, and the heating speed can be 1-5° C. $\min^{-1}$. Finally, the core material coated with a microporous coating layer (a core@MPC composite) can be collected by centrifugalization, then washed 3 times with deionized water, and then dried at an elevated temperature, for example about 50° C., in an electric oven for 12 h.

(ii) Coating at Room Temperature with Biomolecule:

The biomolecule used here for coating at room temperature can be selected from the group consisting of dopamine and sodium alga acid.

In particular, 100-500 parts by weight of the core material can be dispersed in a Tris buffer (pH: ~8.5) by ultrasonication for about 30 min to form suspension. Subsequently, 10-100 parts by weight dopamine can be added to the mixture under stirring. The mixture can be subjected to continuous magnetic stirring at 30° C. for 10-48 h. Afterwards, the precipitates, core@MPC composite, can be collected by centrifugalization, then washed 3 times with deionized water, and then dried at an elevated temperature, for example about 50° C., in an electric oven for 12 h.

(iii) Chemical Vapor Deposit (CVD):

The carbon precursor of the CVD coating can be selected from the group consisting of acetylene and toluene.

In particular, the CVD coating can be carried out by placing an alumina boat with 100-500 parts by weight of the core material in a flow through tube furnace, which can be then heated to a target temperature of 600-900° C. under Argon flow. Once the target temperature has been reached, the flow of Argon can be switched to Argon saturated with acetylene for a heating period of 20-100 min at the target temperature.

(iv) Resorcinol-Formaldehyde Resin (RF) Carbon Coating:

In particular, 10-100 mg of the core material, 10-50 mg of phenol, and 0.1-0.5 mL of ammonia aqueous solution (NH$_4$OH, 25 wt. %) can be added into a solution containing 10 mL of deionized water and 5 mL of ethanol. The solution can be treated by ultrasonication for 5 min to get a homogeneous dispersion. Then, 0.02-0.5 mL of formaldehyde solution can be added to the dispersion, and further ultrasonically treated for 10 min. Subsequently, the resultant dispersion can be transferred into a microwave reaction vessel and placed in the vessel holder. The temperature and reaction time can be set as 100-200° C. and 20-50 min, respectively. After the reaction completed, the microwave reaction vessel can be cooled to room temperature. The as-prepared microspheres can be collected by centrifuge and washed with deionized water and ethanol 3 times and dried in vacuum at an elevated temperature, for example about 50° C., for 4 h.

c) Load of Sulfur

In the step of "c) load of sulfur", sulfur and the substrate to be loaded with sulfur can be mixed in a mass ratio of 1:4-9:1, preferably 3:7-4:1, and more preferably 2:3-3:2, to yield a homogeneous mixture. And then the mixture can be sealed and heated at 130-500° C. for 5-20 h, so that sulfur is dispersed into the substrate.

The step of "c) load of sulfur" can be carried out to achieve a sulfur load amount of 20-90 wt. %, preferably 30-80 wt. %, and more preferably 40-60 wt. %, in each case based on the total weight of the sulfur-containing composite.

The step of "c) load of sulfur" can be carried out before or after the step of "b) applying a microporous coating layer". Thus, the substrate to be loaded with sulfur is the substrate of the core in case of "c) load of sulfur" prior to "b) applying a microporous coating layer", or a core@MPC composite in case of "b) applying a microporous coating layer" prior to "c) load of sulfur".

In case of "b) applying a microporous coating layer" prior to "c) load of sulfur", the method of "b) applying a microporous coating layer" is not particularly limited. And the heating temperature in the subsequent step of "c) load of sulfur" is not particularly limited, preferably in a range of 350-500° C.

In case of "c) load of sulfur" prior to "b) applying a microporous coating layer", the heating temperature in the step of "c) load of sulfur" is preferably in a range of 130-170° C. And the subsequent step of "b) applying a microporous coating layer" is carried out preferably at a relatively low temperature, for example by "(i) hydrothermal microporous carbon coating", "(ii) coating at room temperature with biomolecule" or "(v) in-situ polymerization" as described above.

d) Optionally Applying an Additional Coating Layer:

In order to further enhance the structural stability of the composite obtained from the steps of a)-c), in particular to prevent the possible flaking or cracking of the coating layer of the composite caused by the stress during the discharge-charge processes, an additional coating layer is preferably applied onto the composite.

The step of "d) optionally applying an additional coating layer" is carried out preferably at a relatively low temperature, for example by "(i) hydrothermal microporous carbon coating", "(ii) coating at room temperature with biomolecule" or "(v) in-situ polymerization" as described above.

The step of "d) optionally applying an additional coating layer" can be carried out to obtain a thin coating layer having a thickness of 10-50 nm, preferably 10-20 nm.

The present invention further relates to an electrode material, which comprises the sulfur-containing composite according to the present invention.

The present invention further relates to a lithium-sulfur battery, which comprises the sulfur-containing composite according to the present invention.

The following non-limiting examples illustrate various features and characteristics of the present invention, which is not to be construed as limited thereto.

Example 1: Preparation of a Sulfur-containing Composite Based on CMK-3 with a MPC Layer [S/(CMK@MPC)]

Figure 1:
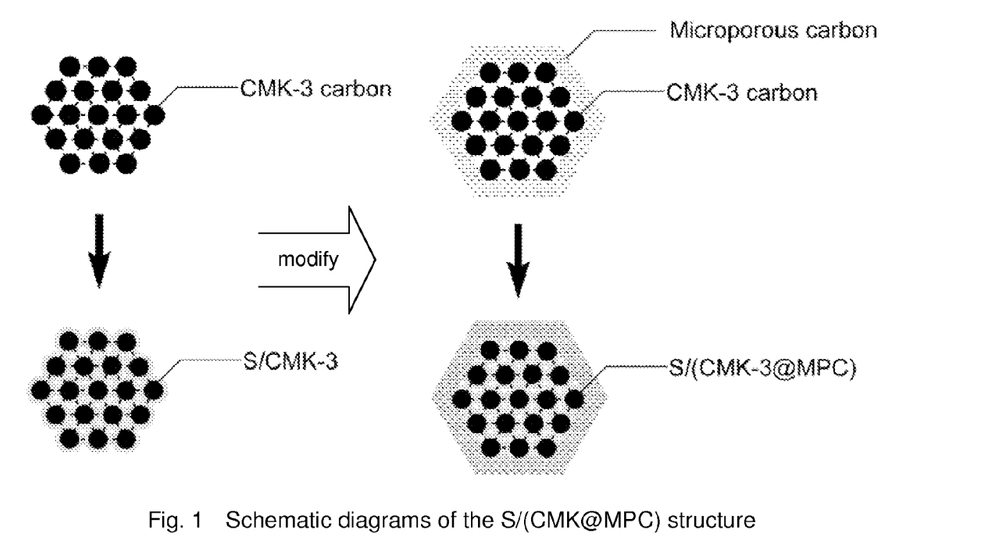
FIG. 1 shows the schematic diagram of the preparation of the S/(CMK@MPC) structure.
Figure 2:
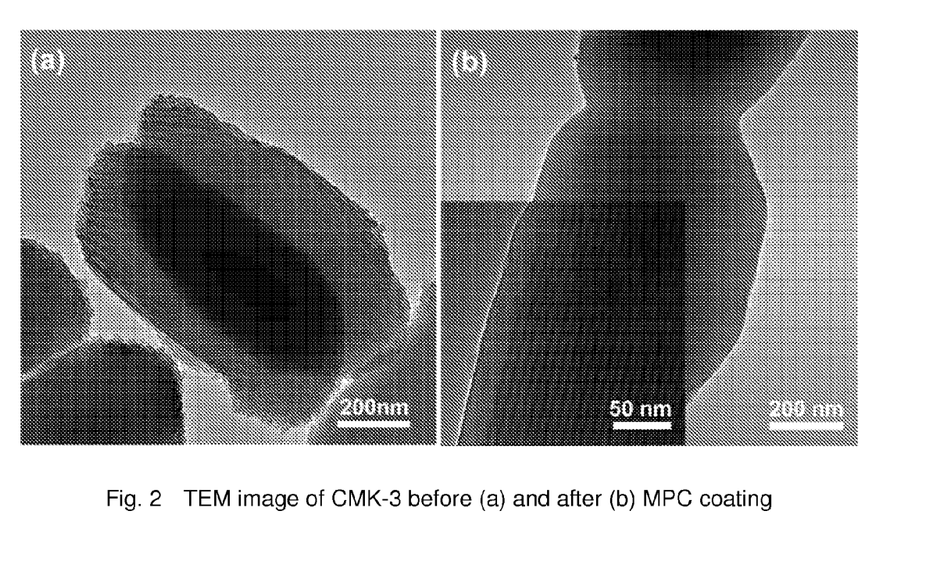
FIG. 2 shows the TEM images of CMK-3 before (a) and after (b) MPC coating.

FIG. 1 shows a schematic diagram of a modified preparation process of the S/(CMK@MPC) structure on the right side.

i) Preparation of a Template SBA-15 as Reported by Zhao:

2 g of Pluronic P123 ($EO_{20}PO_{70}EO_{20}$) was dissolved in 60 ml of 2 M HCl at 38° C. Tetraethylorthosilicate (4.2 g) was added into the above solution with vigorous stirring. The mixture was stirred for only 6 min and remained quiescent for 24 h at 38° C. The mixture was subsequently heated at 100° C. for another 24 h in an autoclave. The as-synthesized SBA-15 with short-rod morphology was collected by filtration, dried and calcined at 550° C. in the air.

ii) Preparation of CMK-3 by Using the Template SBA-15:

Then, 1.25 g of sucrose was dissolved in 5.0 ml of water containing 0.14 g $H_2SO_4$. 1.0 g of surfactant-free SBA-15 was then dispersed in the above solution and the mixture was sonicated for 1 h, then heated at 100° C. for 12 h and at 160° C. for another 12 h in the autoclave. The impregnation process was repeated once again with another 5.0 ml aqueous solution containing 0.8 g sucrose and 0.09 g $H_2SO_4$. FIG. 2(a) shows the TEM image of CMK-3 obtained.

iii) Applying a Microporous Carbon (MPC) Coating Layer:

After that, 200 mg of the as-prepared composite ($C—SiO_2$) was ultrasonically dispersed in 45 ml of aqueous solution containing 400 mg of D-glucose (Sinopharm Chemical Reagent Co., Ltd.) for 4 h, to form a homogenous black suspension. The suspension was then sealed in a 70 mL Parr autoclave with a quartz liner and was heated at 180° C. for 15 h to yield a dark brown precursor. After the hydrothermal reaction, a uniform carbon precursor layer was formed on the composite. The precursor was collected by centrifugation, washed with de-ionized water four times, and then dried at 60° C. overnight. The dried precursor was calcined under argon at 900° C. for 5 h, with a heating rate of 3° C./min and a flow rate of 50 mL min$^{-1}$. To remove the SBA-15 silica template, the composite was stirred in a 5% HF solution at room temperature for 24 h to obtain the CMK@MPC composite (FIG. 2(b)).

iv) Load of Sulfur:

Sulfur and said CMK@MPC composite were mixed by an mass ratio of 1:1 to yield a homogeneous mixture, and then the mixture was sealed in a proper container and heated at 400° C. for 20 h so that sulfur was dispersed into the composite.

v) Structural and Electrochemical Evaluation:

Transmission Electron Microscopy (TEM) was employed to characterize the size and structure of the products (FIG. 2).

Electrochemical measurements were performed with coin cells assembled in an argon-filled glovebox. For preparing working electrodes, a mixture of active material, carbon black, and poly-(vinyl difluoride) (PVDF) at a weight ratio of 80:10:10 was pasted on an Aluminium foil. Lithium foil was used as the counter electrode. A glass fiber sheet (GF/D, Whatman) was used as a separator. An electrolyte (Zhangjiagang Guotai-Huarong New Chemical Materials Co., Ltd.) consisting of a solution of 1 M $LiN(CF_3SO_2)_2$ (LiTFSI) salt in a mixture of 1,3-dioxolane (DOL) and 1,2-dimethoxyethane (DME) (1:1, v/v). Galvanostatic cycling of the assembled cells was carried out by using a battery testing system in the voltage range of 1-3 V (vs. Li$^+$/Li).

Figure 3:
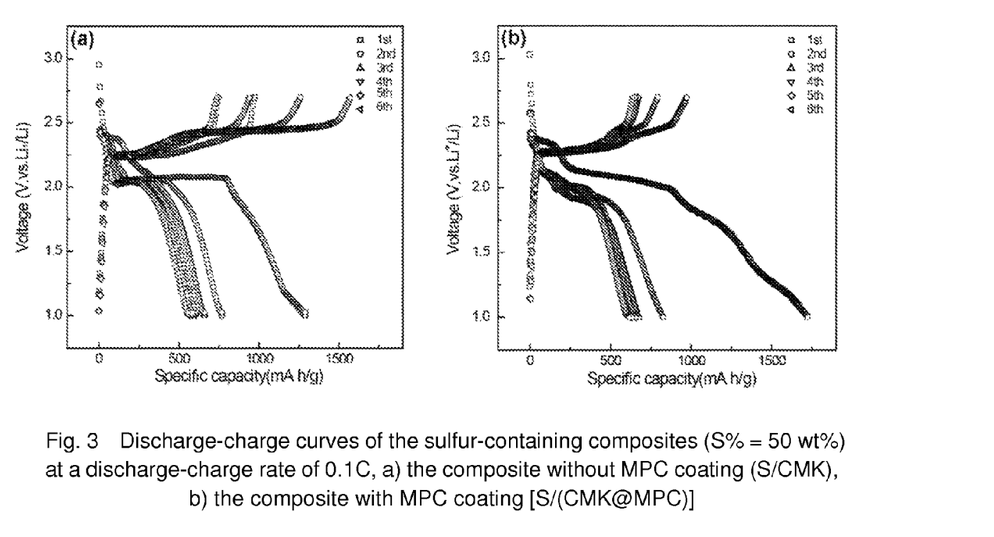
FIG. 3 shows the discharge-charge curves of the sulfur-containing composites (S %=50 wt. %) at a discharge-charge rate of 0.1 C, a) the composite without MPC coating (S/CMK), b) the composite with MPC coating (S/CMK@MPC)
Figure 4:
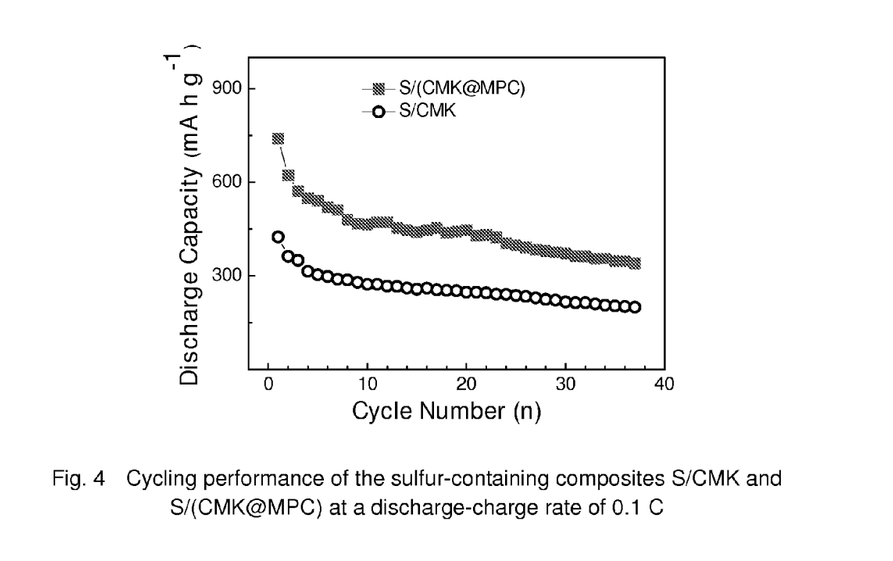
FIG. 4 shows the cycling performance of the sulfur-containing composites S/CMK and S/(CMK@MPC) at a discharge-charge rate of 0.1 C.

FIG. 3(b) shows the discharge-charge curves of the sulfur-containing composites (S/CMK@MPC, S %=50 wt. %) at a discharge-charge rate of 0.1 C. FIG. 4 shows the cycling performance of the sulfur-containing composite S/(CMK@MPC) at a discharge-charge rate of 0.1 C.

Example 2: Preparation of a Sulfur-containing Composite Based on CMK-3 Without a MPC Layer (S/CMK)

The operation of Example 1 was repeated except that the step of "iii) applying a microporous carbon (MPC) coating layer" was dispensed with.

FIG. 1 further shows a schematic diagram of a conventional preparation process of the S/CMK structure on the left side.

FIG. 3(a) shows the discharge-charge curves of the sulfur-containing composites (S/CMK, S %=50 wt. %) at a discharge-charge rate of 0.1 C. FIG. 4 shows the cycling performance of the sulfur-containing composite S/CMK at a discharge-charge rate of 0.1 C. It can be seen that the sole use of a meso-/macroporous substrate can not obtain the optimized result.

Example 3: Preparation of a Sulfur-containing Composite Based on HPCS with a MPC Layer [S/(HPCS@MPC)]

i) Preparation of MPCS:

4.5 g of D-glucose and 30 mg sodium dodecyl sulfate (SDS) were added into 30 mL of water, then the solution was sealed in an autoclave and heated at 180° C. for 4 h to yield the microporous carbon spheres (MPCS). MPCS were centrifuged with de-ionized water for several times and dried in an oven overnight.

ii) Pore Activation (HPCS):

100 mg of as-obtained MPCS were mixed with 5 mL of 1.5 mol/L of KOH solution. The mixture were sonicated for 4 h, stood for 20 h, then filtrated and dried in an oven for overnight.

Figure 5:
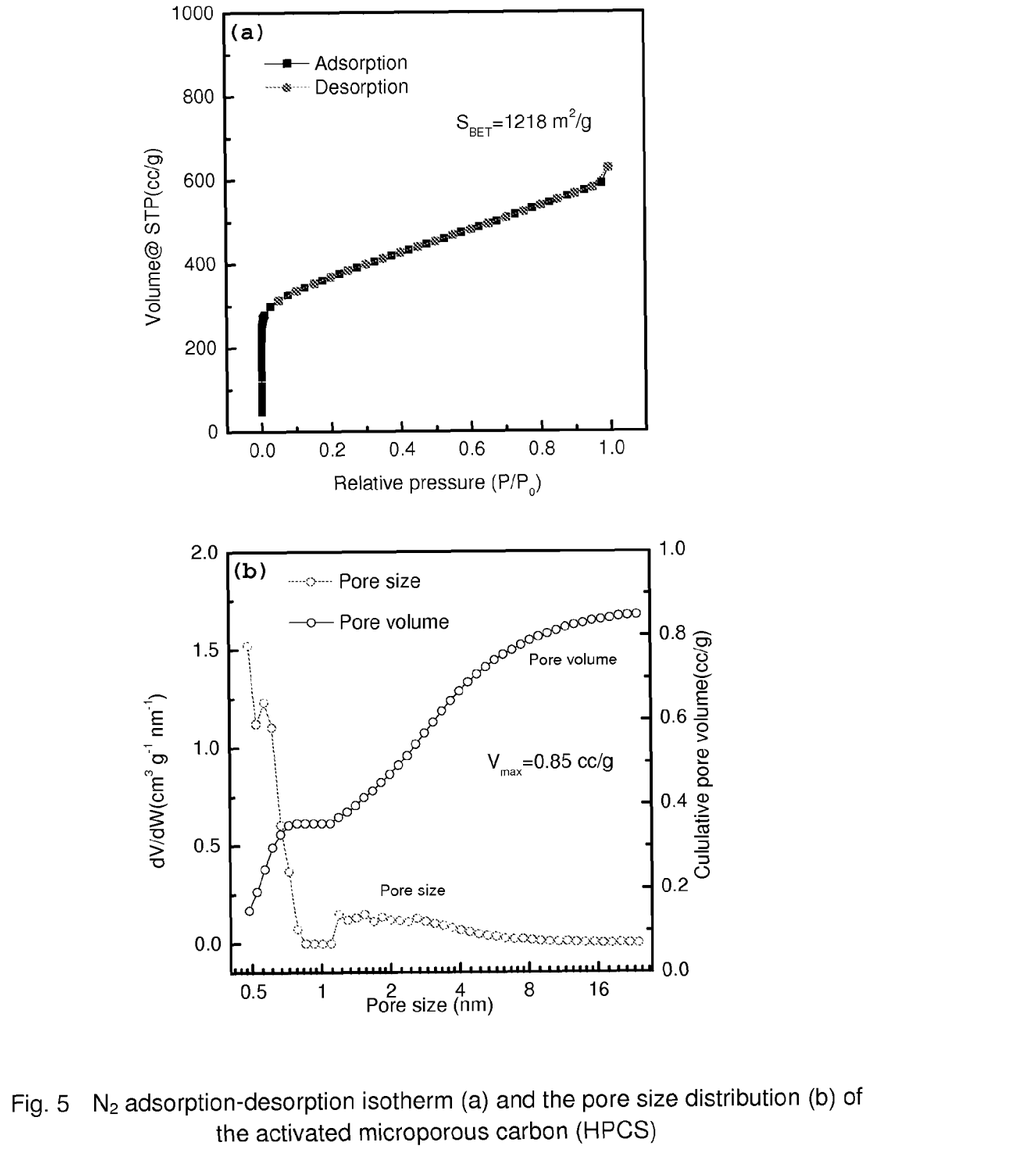
FIG. 5 shows the $N_2$ adsorption-desorption isotherm (a) and the pore size distribution (b) of the activated microporous carbon (HPCS)
Figure 6:
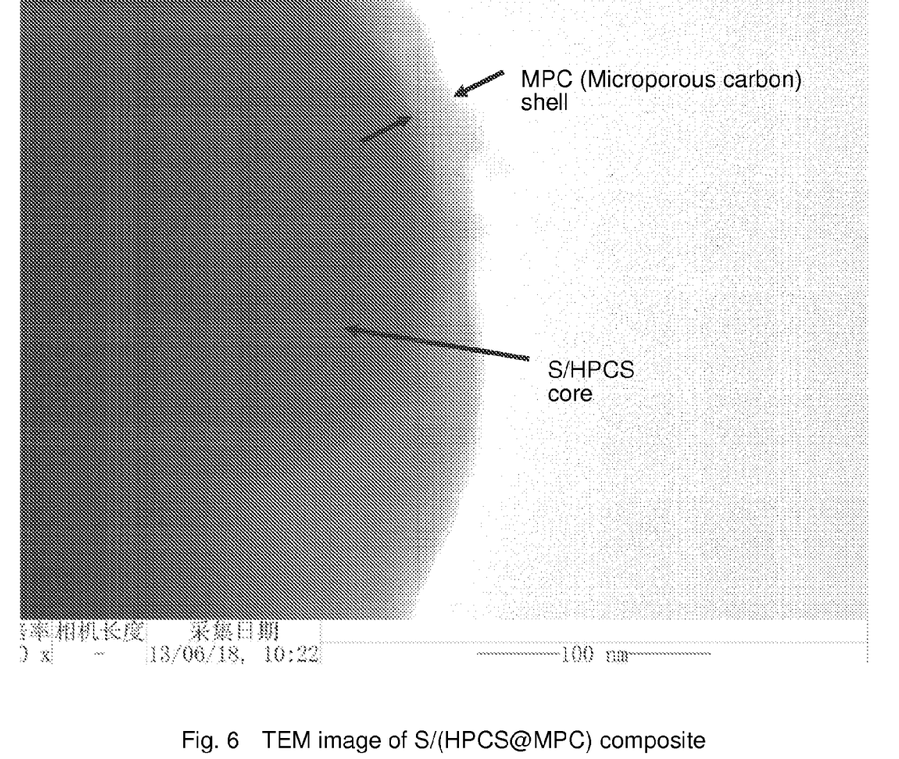
FIG. 6 shows the TEM image of S/(HPCS@MPC) composite.
Figure 7:
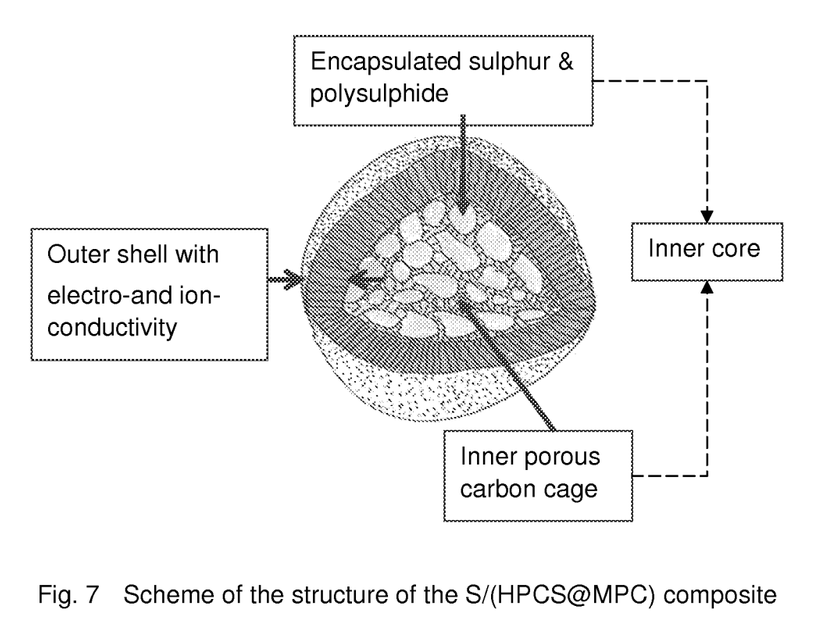
FIG. 7 shows the scheme of the structure of the S/(HPCS@MPC) composite.

MPCS which have absorbed sufficient potassium hydroxide solution were further annealed at 800° C. in an argon atmosphere for 1 h with a heating rate of 5° C./min for pore activation and further carbonization to get HPCS. The final HPCS with an average diameter of 350 nm, a BET surface area of 1218 m$^2$/g and a total pore volume of 0.85 cm$^3$/g (FIG. 5). The bimodal micropore distribution (NLDFT adsorption branch) showed the average micropore of about 0.5 nm and the average mesopore diameter was about 3.8 nm.

iii) Applying a Microporous Coating Layer (HPCS@MPC):

100 mg of HPCS was sealed in an autoclave with a D-glucose solution to applied a second time hydrothermal process in 30 mL of water at 180° C. for 4 h to yield the MPC coating shell. The obtained HPCS@MPC were centrifuged and washed with water and ethanol for several times before being further dried at 50° C. in an oven and heated at 600° C. for 1 h in an inert gas with a heating rate of 5° C./min.

iv) Load of Sulfur [S/(HPCS@MPC)]:

Sulfur and the HPCS@MPC were mixed by an mass ratio of 3:2 in a quartz mortar to yield a homogeneous mixture. After that, the mixture was sealed in a glass container and heated at 450° C. for 20 h to make sulfur dispersed into the composite.

v) Structural and Electrochemical Evaluation:

Transmission Electron Microscopy (TEM) was employed to characterize the structure of the S/(HPCS@MPC) composite (FIG. 6). FIG. 7 shows a scheme of the structure of the S/(HPCS@MPC) composite. The BET surface area and the pore size distribution of the HPCS were characterized by $N_2$ adsorption-desorption isotherm and Non-Local Density Functional Theory (NLDFT) adsorption branch model (FIG. 5).

Electrochemical measurements were performed in accordance with Example 1.

Figure 8:
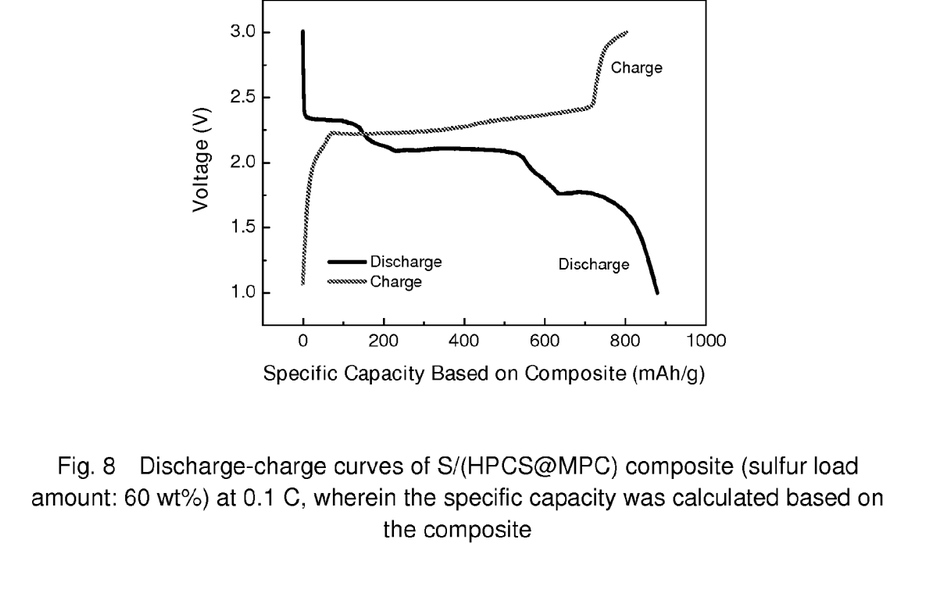
FIG. 8 shows discharge-charge curves of S/(HPCS@MPC) composite (sulfur load amount: 60 wt. %) at 0.1 C, wherein the specific capacity was calculated based on the composite.

When discharged at a rate of 0.1 C, said sulfur-carbon composite demonstrated a first discharge capacity of 879 mA h/g (FIG. 8). The specific capacity was calculated based on the composite mass.

Figure 9:
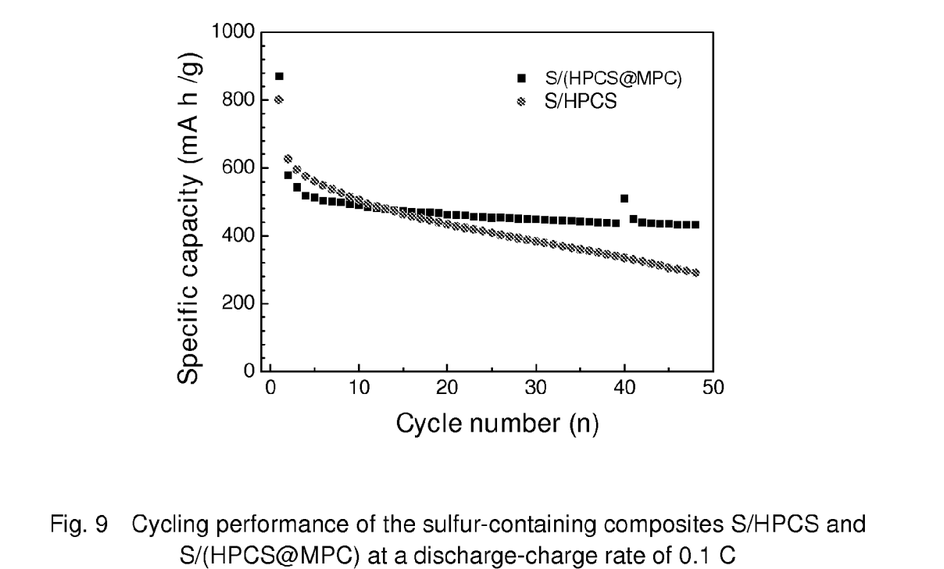
FIG. 9 shows the cycling performance of the sulfur-containing composites S/HPCS and S/(HPCS@MPC) at a discharge-charge rate of 0.1 C.

FIG. 9 shows the cycling performance of the sulfur-containing composite [S/(HPCS@MPC)] obtained in Example 3.

Example 4: Preparation of a Sulfur-containing Composite Based on HPCS Without a MPC Layer (S/HPCS)

The operation of Example 3 was repeated except that the step of "iii) applying a microporous coating layer" was dispensed with.

FIG. 9 further shows the cycling performance of the sulfur-containing composite S/HPCS obtained in Example 4. It can be seen that the sole use of a hierarchically meso-/microporous carbon substrate can not obtain the optimized result.

While certain embodiments have been described, these embodiments have been presented by way of example only, and are not intended to limit the scope of the inventions. The attached claims and their equivalents are intended to cover all the modifications, substitutions and changes as would fall within the scope and spirit of the invention.

The invention claimed is:

1. A sulfur-containing composite with a core-shell structure, wherein the substrate of the core contains macropores and/or mesopores and optionally micropores, and the substrate of the shell is a microporous coating layer; wherein sulfur is loaded into said substrate of the core and optionally the shell; wherein the coating layer is a hydrothermal microporous carbon coating, wherein a carbon source for the coating is a carbohydrate selected from the group consisting of sucrose, D-glucose, fructose, and any combinations thereof, and wherein the substrate of the core is formed by using a silica template.

2. The sulfur-containing composite of claim 1, wherein said substrate of the core is a carbon or conductive non-carbon substrate with ordered or disordered pore structures.

3. The sulfur-containing composite of claim 1, wherein said substrate of the core is a carbon substrate.

4. The sulfur-containing composite of claim 1, wherein said substrate of the core has a BET specific surface area of 300-4500 $m^2/g$.

5. The sulfur-containing composite of claim 1, wherein said substrate of the core has a pore volume of 0.1-3.0 $cm^3/g$.

6. The sulfur-containing composite of claim 1, wherein said substrate of the core has an average pore diameter of 0.4-100 nm.

7. The sulfur-containing composite of claim 1, wherein said microporous coating layer includes one or more material selected from the group consisting of microporous conductive polymer, microporous metal oxides, microporous metal, and microporous silica.

8. The sulfur-containing composite of claim 1, wherein said microporous coating layer has a thickness of 5-100 nm.

9. The sulfur-containing composite of claim 1, wherein said microporous coating layer has an average pore diameter of 0.4-2.0 nm.

10. The sulfur-containing composite of claim 1, wherein said sulfur-containing composite has a sulfur load amount of 20-90 wt. % based on the total weight of said sulfur-containing composite.

11. An electrode material, comprising the sulfur-containing composite of claim 1.

12. A lithium-sulfur battery, comprising the sulfur-containing composite of claim 1.

13. The sulfur-containing composite of claim 1, wherein said substrate of the core is a carbon substrate selected from the group consisting of ordered mesoporous carbons CMK-3 and CMK-5, activated porous carbon, active charcoal, and any combinations thereof.

14. A process for preparing a sulfur-containing composite with a core-shell structure, including the steps of:
a) providing a substrate of the core, which contains macropores and/or mesopores and optionally micropores; and then
b) applying a microporous coating layer as the shell onto said substrate of the core, before or after
c) loading sulfur into said substrate of the core and optionally the shell,
wherein the coating layer is a hydrothermal microporous carbon coating, wherein a carbon source for the coating is a carbohydrate selected from the group consisting of sucrose, D-glucose, fructose, and any combinations thereof, and wherein the substrate of the core is formed by using a silica template.

15. The process of claim 14, wherein said microporous coating layer is also applied by one or more coating methods selected from the group consisting of coating at room temperature with biomolecule, CVD coating, conductive polymer coating, resorcinol-formaldehyde resin carbon coating, and in-situ polymerization.

16. The process of claim 14, wherein said substrate of the core is a carbon substrate with ordered pore structures; wherein after having applied the microporous coating layer onto said substrate of the core, said template is then removed.

17. The process of claim 14, wherein the microporous coating layer is applied onto said substrate of the core; and then the sulfur is loaded into said substrate of the core and the shell; and then an additional coating layer is applied.

18. An electrode material, comprising the sulfur-containing composite prepared by the process of claim 14.

19. A lithium-sulfur battery, comprising the sulfur-containing composite prepared by the process of claim 14.

* * * * *